US012679193B2

(12) United States Patent　　(10) Patent No.:　US 12,679,193 B2
Shimura　　(45) Date of Patent:　Jul. 14, 2026

(54) BATTERY MOUNTING STRUCTURE

(71) Applicant: TOYOTA JIDOSHA KABUSHIKI KAISHA, Toyota (JP)

(72) Inventor: Gou Shimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 18/606,408

(22) Filed: Mar. 15, 2024

(65) Prior Publication Data

US 2025/0033455 A1　　Jan. 30, 2025

(30) Foreign Application Priority Data

Jul. 25, 2023　(JP) .................................. 2023-121138

(51) Int. Cl.
　B60K 1/04　　　　(2019.01)
　H01M 50/249　　　(2021.01)
(52) U.S. Cl.
　CPC ............. B60K 1/04 (2013.01); H01M 50/249 (2021.01); B60K 2001/0438 (2013.01); H01M 2220/20 (2013.01)
(58) Field of Classification Search
　CPC ........ B60K 2001/0438; H01M 50/249; H01M 50/242; H01M 2220/20
　See application file for complete search history.

(56) References Cited

U.S. PATENT DOCUMENTS

| 11,370,287 | B2 * | 6/2022 | Tsuyuzaki | ............ B62D 21/157 |
| 11,772,473 | B2 * | 10/2023 | Suewaka | ............. H01M 6/5038 |
| | | | | 429/120 |
| 12,043,104 | B2 * | 7/2024 | Asa | ......................... B60K 1/04 |
| 2022/0144063 | A1 | 5/2022 | Tatsuwaki et al. | |
| 2024/0166060 | A1 * | 5/2024 | Tyerman | ............. H01M 50/242 |

FOREIGN PATENT DOCUMENTS

| JP | 2019-014384 A | 1/2019 |
| JP | 2022-077194 A | 5/2022 |

* cited by examiner

*Primary Examiner* — Huan Le
(74) *Attorney, Agent, or Firm* — SoraIP, Inc.

(57)　　　　　ABSTRACT

In a vehicle, an elastic member is interposed between a first joining member joined to a body side and a second joining member joined to a battery case side in a joining portion between a body constituting a framework of the vehicle and a battery case mounted below a floor panel of the vehicle. Thus, the battery case that is a heavy object functions as a dynamic damper and suppresses vibration of the body. In addition, a protruding portion protruding from the second joining member is provided in the first gap provided between the first joining member and the second joining member. Accordingly, the load input to the body can be quickly conveyed to the battery case side through the protruding portion and dispersed. Accordingly, the impact resistance in the event of a collision can be improved.

5 Claims, 5 Drawing Sheets

BATTERY MOUNTING STRUCTURE

CROSS-REFERENCE TO RELATED APPLICATION

This application claims priority to Japanese Patent Application No. 2023-121138 filed on Jul. 25, 2023, incorporated herein by reference in its entirety.

BACKGROUND

1. Technical Field

The disclosure relates to a battery mounting structure for a vehicle.

2. Description of Related Art

Japanese Unexamined Patent Application Publication No. 2019-014384 (JP 2019-014384 A) discloses that an elastic support member is provided between a battery device and a vehicle body, and the battery device is elastically supported with respect to the vehicle body. Accordingly, the battery device functions as a dynamic damper and suppresses vibration of the vehicle body, which is also disclosed therein.

SUMMARY

Now, from a viewpoint of improving impact resistance in the event of a collision, it is desirable to quickly convey a load input to the vehicle body in the event of a collision to a battery case side, so as to disperse the load. However, in JP 2019-014384 A, the battery device is elastically supported with respect to the vehicle body. Therefore, there is room for improvement in securing a quick load conveyance path.

The disclosure has been made in view of the foregoing. An object of the disclosure is to obtain a battery mounting structure that is capable of suppressing vibration of a vehicle body and improving impact resistance in the event of a collision.

A battery mounting structure according to a first aspect includes a body that makes up a framework of a vehicle, a battery case that is joined to the body and that is mounted at an underfloor of the vehicle, a first joining member that is joined to the body side, at a joining portion of the body and the battery case, a second joining member that is joined to the battery case side and that is attached across a predetermined gap with respect to the first joining member, an elastic member that is disposed in the gap and is interposed between the first joining member and the second joining member, a protruding portion that is provided protruding from one of the first joining member and the second joining member to the gap.

In the battery mounting structure according to the first aspect, an elastic member is interposed between the first joining member joined to the body side and the second joining member joined to the battery case side in the joining portion, between the body making up the framework of the vehicle and the battery case mounted at the underfloor of the vehicle. Thus, the battery case that is a heavy object functions as a dynamic damper and suppresses vibration of the body.

Also, a protruding portion protruding from one of the first joining member and the second joining member is provided in a gap provided between the first joining member and the second joining member. Accordingly, the load input to the body can be quickly conveyed to the battery case side through the protruding portion and dispersed. Accordingly, the impact resistance in the event of a collision can be improved.

The battery mounting structure according to a second aspect further includes, in the first aspect, a support member that extends from a lateral side of the battery case to the body side, in which the second joining member is joined to the battery case via the support member.

In the battery mounting structure according to the second aspect, the battery case and the second joining member are joined by interposing a support member that extends from the lateral side of the battery case to the body side. Accordingly, the joining portion between the body and the battery case can be disposed on the lateral side of the battery case. As compared with a configuration in which the battery case is elastically supported from a vehicle downward side, mounting space of the battery case can be reduced in a vehicle height direction. As a result, space efficiency of a vehicle lower portion is improved. Expanding vehicle cabin space provided above the floor, and securing height of a bottom face of the vehicle body, are facilitated.

In the battery mounting structure according to a third aspect, in the second aspect, the support member includes a first support portion disposed on a vehicle-outward side with respect to the second joining member, and a second support portion disposed on a vehicle-inward side with respect to the second joining member.

In the battery mounting structure according to the third aspect, the support member includes a first support portion and a second support portion. The first support portion is disposed on a vehicle-outward side with respect to the second joining member. The second support portion is disposed on a vehicle-inward side with respect to the second joining member. As a result, the load input to the vehicle lower portion is quickly conveyed to the battery case side via the first support portion. Accordingly, the impact resistance in the event of a collision can be improved.

In the battery mounting structure according to a fourth aspect, in any one of the first to third aspects, the protruding portion is provided such that a distal end of the protruding portion is spaced apart from a counterface.

In the battery mounting structure according to the fourth aspect, the protruding portion is provided such that the distal end thereof is spaced apart from the counterface. Thus, when the body and the battery case vibrate, the distal end of the protruding portion does not interfere with the counterface. Accordingly, generation of abnormal noise due to contact between the protruding portion and the counterface when the body and the battery case vibrate can be suppressed.

In the battery mounting structure according to a fifth aspect, in any one of the first to third aspects, the first joining member and the second joining member are fashioned in a cylindrical shape of which an axial direction is in a vehicle-up-down direction, the first joining member is inserted inside the second joining member, and the elastic member includes a first elastic portion disposed on one side in the axial direction with respect to the protruding portion, and a second elastic portion disposed on the other side in the axial direction with respect to the protruding portion.

In the battery mounting structure according to the fifth aspect, the first joining member and the second joining member are fashioned in a cylindrical shape of which an axial direction is in a vehicle-up-down direction. Also, the first joining member is inserted inside the second joining member. Further, the elastic member has a first elastic portion disposed on one side in the axial direction with respect to the protruding portion and a second elastic portion disposed on the other side in the axial direction. Thus, vibration in the vehicle-up-down direction (gravitational direction) can be stabilized using weight of the battery case.

As described above, according to the battery mounting structure of the disclosure, vibration of the vehicle body can be suppressed. Impact resistance in the event of a collision can also be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
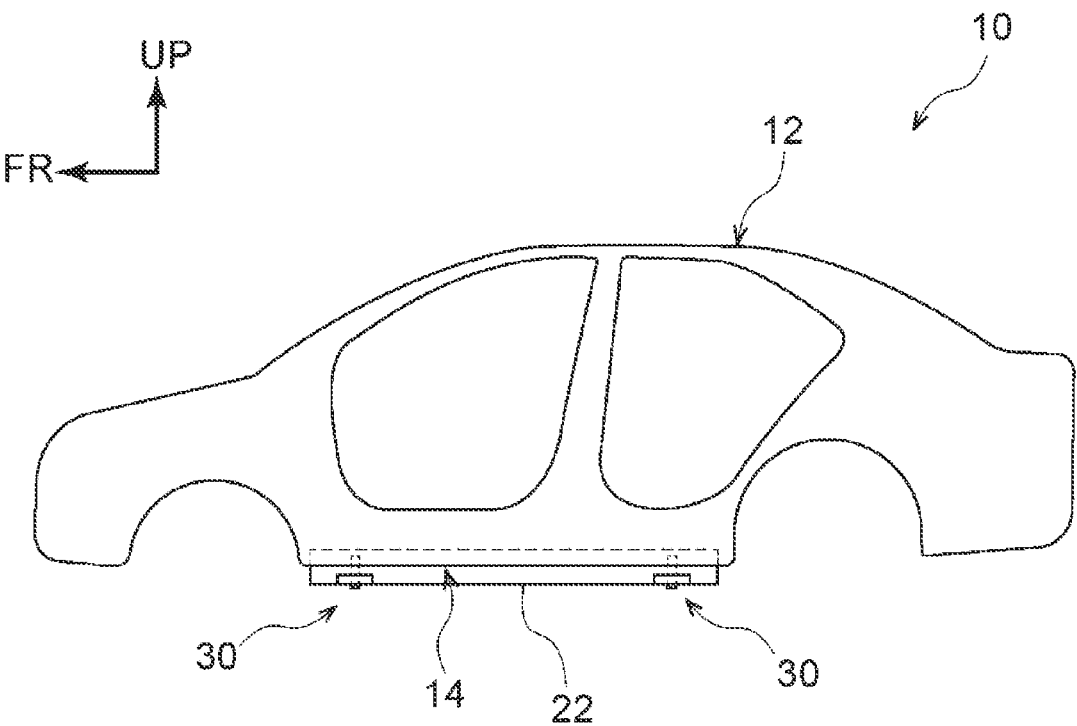
FIG. 1 is a schematic view of a body of a vehicle according to an embodiment as viewed from a vehicle width direction.

A vehicle 10 including a battery mounting structure according to an embodiment will be described with reference to the drawings. Note that the arrow UP shown in the drawings indicates the upper side in the up-down direction of the vehicle. The arrow FR shown in the drawings indicates the front side in the front-rear direction of the vehicle. The arrow LH shown in the drawings indicates the left side in the vehicle-width direction. In the following description, the up-down direction and the left-right direction refer to the up-down direction and the left-right direction in the vehicle up-down direction and the vehicle width direction, respectively.

Body

FIG. 1 is a schematic view of a body 12 constituting a framework of a vehicle 10 as viewed from a vehicle width direction. As shown in this figure, the body 12 includes a rocker 14 that constitutes the framework of the vehicle lower portion. The rocker 14 is formed in a hollow beam shape extending in the vehicle front-rear direction. The rockers 14 are arranged in a pair at intervals in the vehicle width direction.

Figure 3:
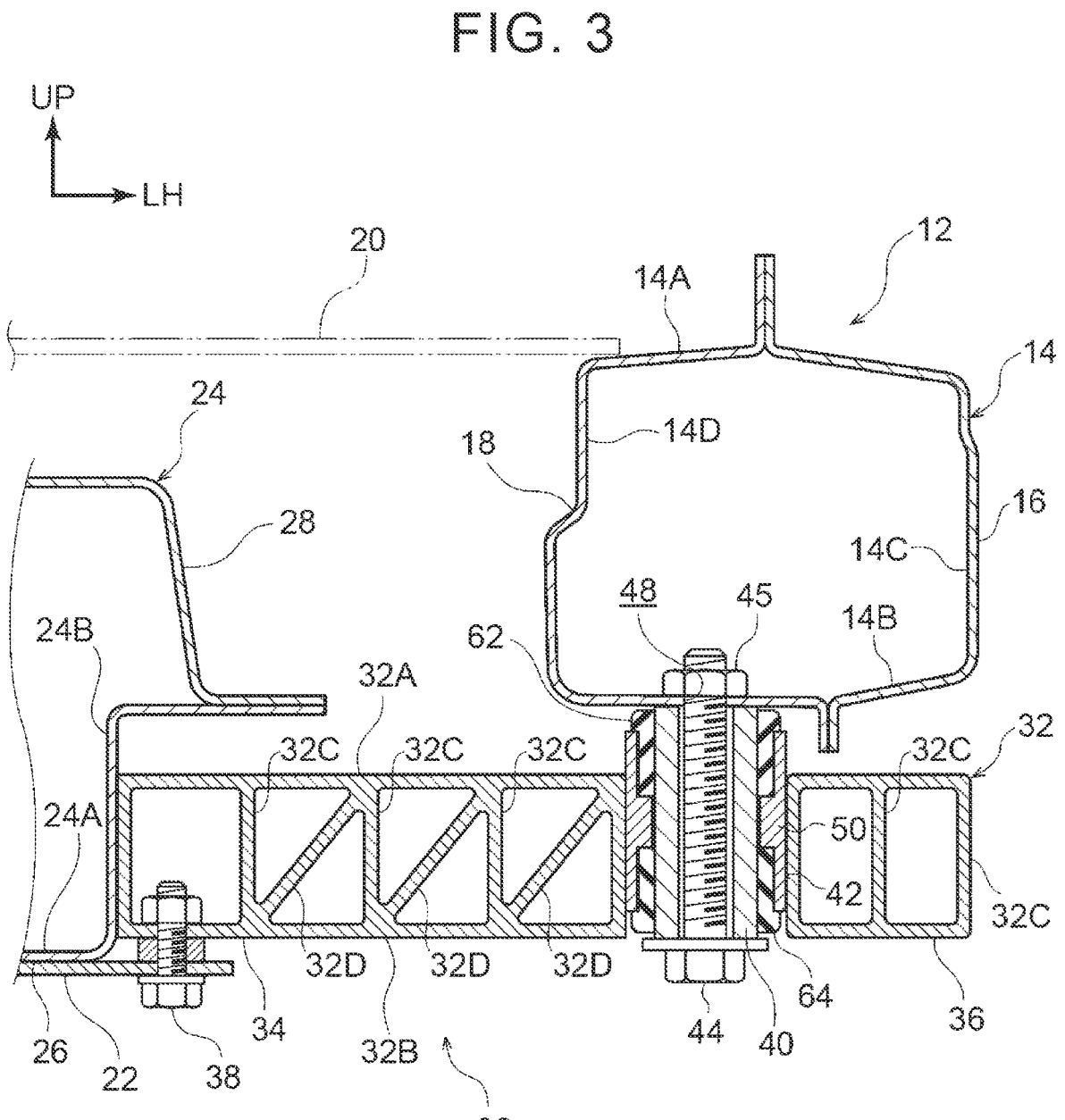
FIG. 3 is a cross-sectional view taken along III-III of FIG. 2.

The rocker 14 includes a rocker outer 16 made of sheet metal and a rocker inner 18 made of sheet metal. The rocker outer 16 is disposed on the vehicle width direction outer side. The rocker inner 18 is disposed on the vehicle width direction inner side with respect to the rocker outer 16. As shown in FIG. 3, the rocker outer 16 has a substantially hat-shaped cross-sectional shape that opens inward in the vehicle width direction. A flange is formed at an upper end portion and a lower end portion of the rocker outer 16. The rocker inner 18 has a substantially hat-shaped cross-sectional shape that opens outward in the vehicle width direction. A flange is formed at an upper end portion and a lower end portion of the rocker inner 18. In the rocker 14, the rocker outer 16 and the rocker inner 18 are superimposed in the vehicle width direction, and the flanges of the upper end portion and the flanges of the lower end portion are joined to each other by welding or the like. Thus, the rocker 14 has a configuration in which a rectangular closed cross section is formed by the upper wall portion 14A, the lower wall portion 14B, the outer wall portion 14C, and the inner wall portion 14D. The upper wall portion 14A constitutes an upper surface. The lower wall portion 14B constitutes a lower surface. The outer wall portion 14C connects the outer end portions of the upper wall portion 14A and the lower wall portion 14B to each other. The inner wall portion 14D connects the inner end portions of the upper wall portion 14A and the lower wall portion 14B to each other.

Floor Panel

A floor panel 20 made of sheet metal is disposed inside the pair of left and right rockers 14. The floor panel 20 extends in the vehicle front-rear direction and the vehicle width direction and constitutes a floor of the vehicle cabin. The outer peripheral portion of the floor panel 20 is joined to the upper wall portions 14A of the left and right rockers 14 and a cross member (not shown) bridged between the rockers 14 by welding or the like.

Battery Case

A battery case 24 in which a plurality of secondary batteries are accommodated is mounted below the floor panel 20. The battery case 24 is formed in a flat rectangular box shape. The battery case 24 extends in the vehicle front-rear direction and the vehicle width direction. As shown in FIG. 3, the battery case 24 includes a box-shaped lower case 26 that opens to the vehicle upper side and a box-shaped upper case 28 that opens to the vehicle lower side. The battery case 24 is formed by joining the outer peripheral portion of the lower case 26 and the outer peripheral portion of the upper case 28 in the vehicle vertical direction. The lower case 26 and the upper case 28 may be formed of sheet metal, a laminate film, or the like.

Joining Portion

Referring back to FIG. 1, the outer peripheral portion of the battery case 24 is joined to the body 12 via a plurality of joining portions 30. In the present embodiment, as an example, the joining portion 30 is provided on the front end side and the rear end side of each rocker 14 in the vehicle front-rear direction. The body 12 is joined to the battery case 24 at a total of four locations.

Figure 2:
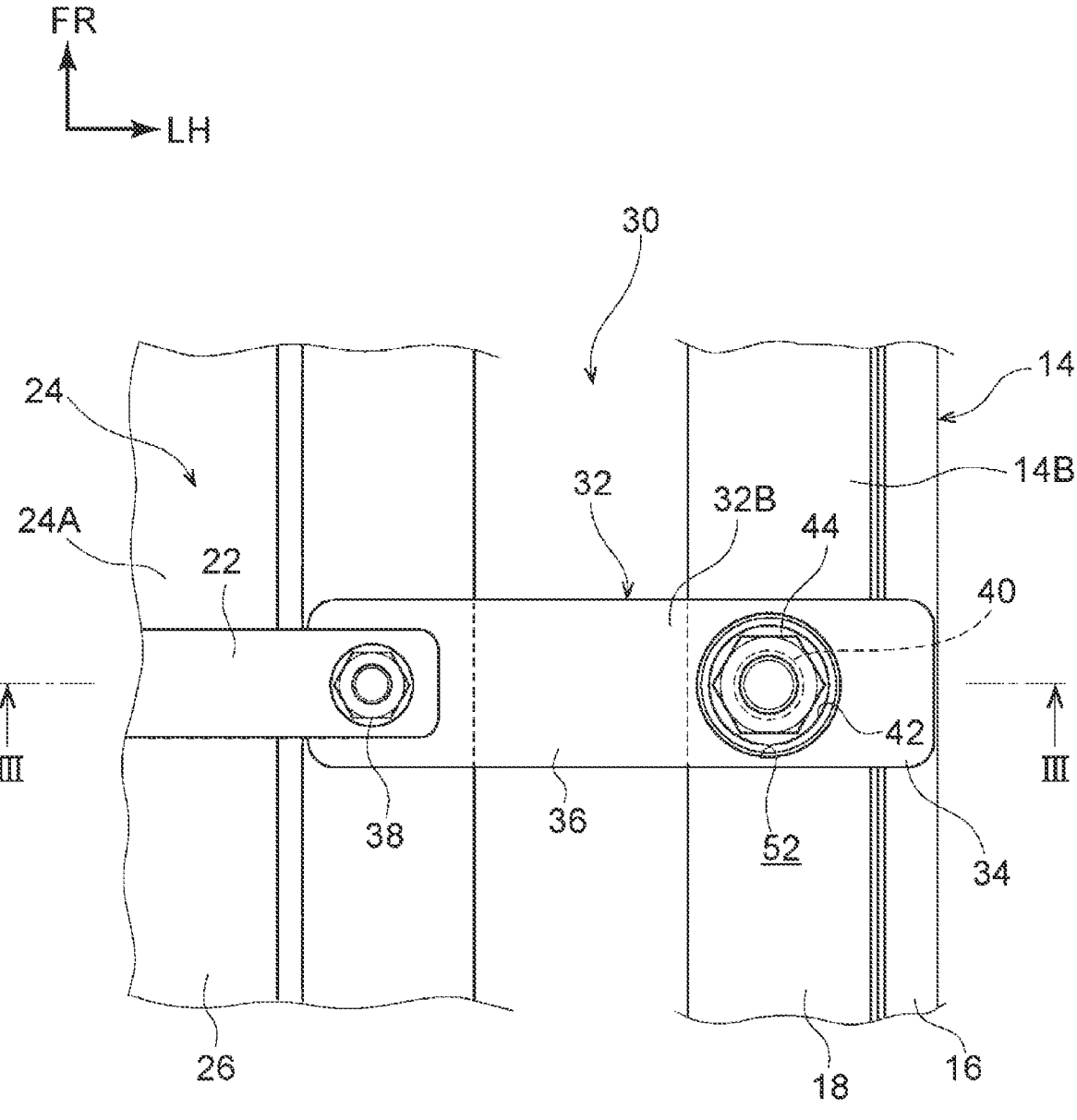
FIG. 2 is a schematic view of a joining portion between a body of a vehicle and a battery case according to the embodiment, as viewed from a vehicle lower side.

FIG. 2 illustrates a state in which the joining portion 30 in which the rocker 14 and the battery case 24 disposed on the left side portion of the vehicle 10 are joined to each other is viewed from the vehicle lower side. As shown in this figure, the rocker 14 and the battery case 24 are connected in the vehicle width direction via an elongated support member 32.

As shown in FIG. 3, the support member 32 is formed in a hollow beam shape and extends in the vehicle width direction.

An end portion of the support member 32 on the vehicle width direction inner side is joined to one end portion of the bracket 22 extending from the battery case 24 by using a bolt 38 and a nut 39. The other end portion of the bracket 22 is joined to a bottom wall portion 24A constituting the lower surface of the battery case 24. In this condition, the support member 32 is disposed to face the side wall portion 24B of the battery case 24. The support member 32 extends from the side of the battery case 24 toward the rocker 14.

The vehicle-width-direction outer end portion of the support member 32 is joined to the lower wall portion 14B of the rocker 14 via the first joining member 40, the second joining member 42, and the elastic member 60. In this condition, the bottom wall portion 24A of the battery case 24 is set at a position lower than the height of the lower wall portion 14B of the rocker 14.

The first joining member 40 is joined to the lower wall portion 14B of the rocker 14 using a bolt 44 and a nut 45. The first joining member 40 is a cylindrical member made of metal whose axial direction is the vehicle vertical direction. For example, the first joining member 40 may be formed of a cylindrical collar.

Figure 4:
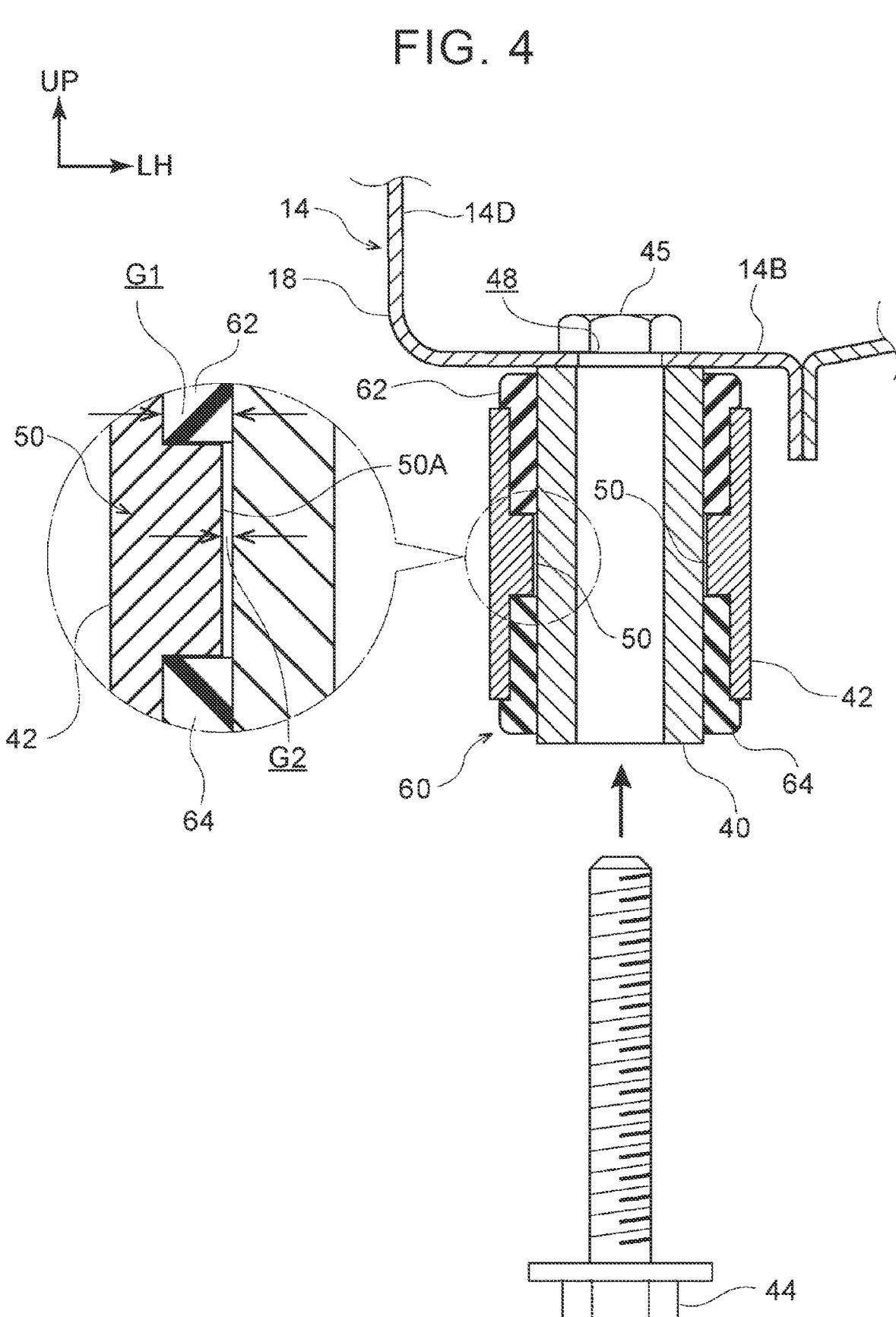
FIG. 4 is an enlarged cross-sectional view illustrating the first joining member and the second joining member according to the embodiment.

As shown in FIG. 4, the bolt 44 is inserted into the first joining member 40 from the vehicle lower side. The distal end of the bolt 44 is inserted into a bolt hole 48 formed in the lower wall portion 14B of the rocker 14. The distal end of the bolt 44 is configured to be screwed into a nut 45 welded to the periphery of the bolt hole 48.

The second joining member 42 is joined to the battery case 24 via the support member 32. The second joining member 42 is a cylindrical member made of metal whose axial direction is the vehicle vertical direction. For example, the second joining member 42 may be formed of a cylindrical collar having a diameter larger than that of the first joining member. The second joining member 42 has an axial length shorter than that of the first joining member 40.

The second joining member 42 is attached to the first joining member 40 with a first gap G1 provided therein by inserting the first joining member 40 therein.

In addition, the second joining member 42 has a protruding portion 50 provided at an intermediate portion in the axial direction. The protruding portion 50 is provided so as to protrude from the inner peripheral surface of the second joining member 42 in the first gap G1. The protruding portion 50 is disposed such that the distal end 50A is close to the first joining member 40. The distal end 50A of the protruding portion 50 is spaced apart from the facing surface (outer peripheral surface) of the first joining member 40. A second gap G2 is provided between the distal end 50A of the protruding portion 50 and the first joining member 40.

The protruding portion 50 may be formed in an annular shape or an island shape. In the case where the protruding portion 50 is formed in an island shape, a plurality of protruding portions 50 may be arranged along the circumferential direction of the second joining member 42.

The second joining member 42 is inserted inside the penetrating portion 52 formed in the support member 32. The penetrating portion 52 is a penetrating hole that penetrates the support member 32 in the vehicle vertical direction. In a state in which the second joining member 42 is inserted into the penetrating portion 52, a part of the outer peripheral surface is joined to the support member 32 by welding or the like. Accordingly, the second support member 32 is joined to the battery case 24 via the support member 32.

The support member 32 includes a first support portion 34 disposed on the vehicle outer side with respect to the second joining member 42, and a second support portion 36 disposed on the vehicle inner side with respect to the second joining member 42. Here, the second support portion 36 disposed between the second joining member 42 and the battery case 24 has higher rigidity than the first support portion 34.

Details of the support member 32 will now be described. The support member 32 has a closed cross section having a rectangular cross section in a direction orthogonal to the extending direction (vehicle front-rear direction). Further, a plate-shaped first reinforcing portion 32C that vertically connects the upper surface portion 32A and the lower surface portion 32B is provided inside the support member 32. A plurality of first reinforcing portions 32C are provided in the support member 32 along the extending direction. The plurality of first reinforcing portions 32C divide the inside of the support member 32 into a plurality of spaces. Therefore, the cross section along the extending direction of the support member 32 is in the form of a grid.

In addition, a plurality of second reinforcing portions 32D connecting the first reinforcing portions 32C adjoining each other are provided inside the support member 32. The second reinforcing portion 32D is a plate-shaped member connecting the upper end and the lower end of the first reinforcing portion 32C. The second reinforcing portion 32D increases the stiffness of the closed cross section formed by the upper surface portion 32A, the lower surface portion 32B, and the first reinforcing portion 32C. The second reinforcing portion 32D is formed only in the second support portion 36 of the support member 32. As described above, in the support member 32, the rigidity of the second support portion 36 is higher than that of the first support portion 34.

When a load is input to the first support portion 34 of the support member 32 by a side projection or the like of the vehicle 10, the load is conveyed to the battery case 24 via the first support portion 34, the second joining member 42, and the second support portion 36. At this time, in the first support portion 34, the closed cross section formed by the upper surface portion 32A, the lower surface portion 32B, and the first reinforcing portion 32C is deformed to absorb the impact. On the other hand, in the second support portion 36, deformation of the closed cross section formed by the upper surface portion 32A, the lower surface portion 32B, and the first reinforcing portion 32C is suppressed by the second reinforcing portion 32D. As a result, the load is rapidly conveyed from the second support portion 36 to the battery case 24, so that the load is dispersed. Then, it is possible to suppress the rocker 14 from being deformed to the inside of the vehicle cabin.

As shown in FIG. 4, the elastic member 60 is disposed in the first gap G1 provided between the first joining member 40 and the second joining member 42.

The elastic member 60 includes a first elastic portion 62 disposed on one axial side (vehicle upper side) with respect to the protruding portion 50 of the second joining member 42, and a second elastic portion 64 disposed on the other axial side (vehicle lower side) with respect to the protruding portion 50. The first elastic portion 62 and the second elastic portion 64 may be formed of, for example, a cylindrical bush made of an elastic material such as rubber. For example, the first elastic portion 62 and the second elastic portion 64 are disposed symmetrically about the protruding portion 50 in the axial direction.

The first elastic portion 62 is interposed between the first joining member 40 and the second joining member 42 in the first gap G1 formed above the protruding portion 50, and an axial end portion covers a part of the upper surface of the second joining member 42. The second elastic portion 64 is interposed between the first joining member 40 and the second joining member 42 in the first gap G1 formed below the protruding portion 50, and an axial end portion covers a part of the upper surface of the second joining member 42. The first elastic portion 62 and the second elastic portion 64 are configured to elastically deform following the axial displacement of the second joining member 42.

Action and Effect

With the configuration described above, in the present embodiment, the battery case 24 mounted at the underfloor of the vehicle 10 is elastically supported by the body 12 via the joining portion 30. Therefore, the battery case 24, which is a heavy object, functions as a dynamic damper, and it is possible to suppress vibration of the body 12 during traveling of the vehicle 10.

Specifically, the elastic member 60 is interposed between the first joining member 40 joined to the body 12 side and the second joining member 42 joined to the battery case 24 side. The elastic member 60 functions as a spring member having a predetermined spring constant.

The relation between the frequency f [Hz] of the vibration of the dynamic damper having the battery case 24 as a mass body, the mass M [kg] of the battery case 24, and the spring constant K [N/m] of the elastic member 60 can be expressed by the following equation (1).

$$f = \frac{1}{2\pi}\sqrt{\frac{K}{M}} \qquad \text{Equation 1}$$

Here, a peak frequency [Hz] corresponding to the peak of the vibration level [dB] is present in the vibration property at the time of resonance of the body 12. Therefore, in the dynamic damper having the battery case 24 as a mass body, the spring constant K [N/m] of the elastic member 60 is set in accordance with the mass M [kg] of the battery case 24 so that the frequency f [Hz] of the battery case 24 is equal to the peak frequency. Thus, the vibration absorbing effect of the bending vibration of the body 12 can be enhanced.

Further, in the present embodiment, a protruding portion 50 protruding from the second joining member 42 is provided in a gap provided between the first joining member 40 and the second joining member 42. Therefore, the load input to the body 12 (the rocker 14) can be quickly conveyed to the battery case 24 side through the protruding portion 50 to disperse the load. Accordingly, the impact resistance in the event of a collision can be improved.

In the present embodiment, the battery case 24 and the second joining member 42 are joined to each other by interposing a support member 32 extending from the side of the battery case 24 toward the body 12. As a result, the joining portion 30 between the body 12 and the battery case 24 can be disposed on the side of the battery case 24. As compared with a configuration in which the battery case 24 is elastically supported from the vehicle lower side, the mounting space of the battery case 24 can be reduced in the vehicle height direction. As a result, space efficiency of a vehicle lower portion is improved. Then, it is easy to expand the vehicle cabin space provided on the floor panel 20 and to secure the height of the bottom surface of the vehicle body.

Further, in the present embodiment, the support member 32 includes a first support portion 34 disposed on the vehicle outer side with respect to the second joining member 42, and a second support portion 36 disposed on the vehicle inner side with respect to the second joining member 42. As a result, the load input to the vehicle lower portion is quickly conveyed to the battery case 24 via the first support portion 34. Therefore, the impact resistance at the time of collision is improved.

Further, in the present embodiment, as shown in FIG. 3, the battery case 24, the support member 32, the second joining member 42, the protruding portion 50, and the first joining member 40 are arranged side by side in the vehicle width direction at a predetermined height position in the vehicle vertical direction. Therefore, the impact resistance in the side collision of the vehicle can be improved.

In addition, in the present embodiment, the protruding portion 50 is provided with a distal end spaced apart from the facing surface. Therefore, when the body 12 and the battery case 24 vibrate, the tip end of the protruding portion 50 does not interfere with the facing surface. Thus, when the body 12 and the battery case 24 vibrate, generation of abnormal noise due to contact between the protruding portion 50 and the facing surface can be suppressed.

In addition, the elastic member 60 is not disposed in the second gap G2 provided between the protruding portion 50 and the facing surface. Therefore, when the load at the time of collision is conveyed from the first joining member 40 to the second joining member 42, the distal end of the protruding portion 50 directly contacts the facing surface. As a result, the load can be conveyed on the contact surface in a state of being metal-touch. Therefore, the contact surface is less likely to be displaced, and the conveying efficiency of the load can be increased.

Further, in the present embodiment, the first joining member 40 and the second joining member 42 are formed in a cylindrical shape whose axial direction is the vehicle vertical direction. The elastic member 60 includes a first elastic portion 62 disposed on one side in the axial direction with respect to the protruding portion 50 and a second elastic portion 64 disposed on the other side in the axial direction. This makes it possible to stabilize the vibration in the vehicle vertical direction (gravity direction) using the weight of the battery case 24.

About Modification

The battery mounting structure according to the embodiment has been described above. However, the present disclosure is not limited to the configuration described in the above embodiment. Each configuration of the above-described embodiment can be appropriately changed without departing from the gist of the disclosure.

First Modification

Figure 5:
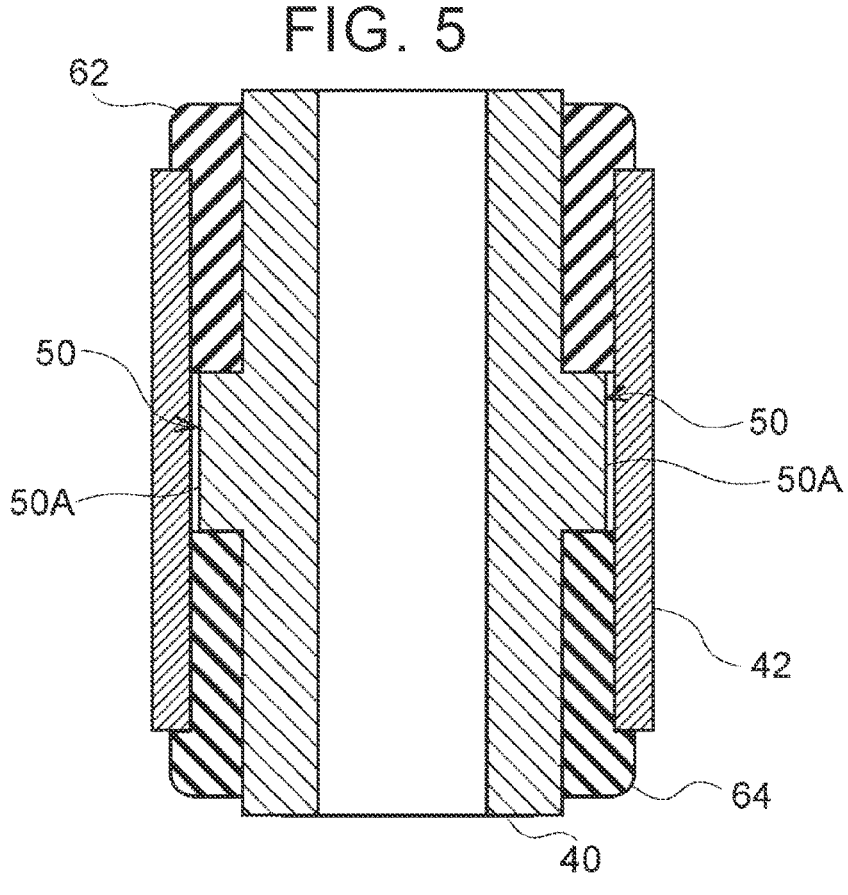
FIG. 5 is a cross-sectional view showing a first joining member and a second joining member according to a first modification.

For example, in the above-described embodiment, the protruding portion 50 is provided so as to protrude from the second joining member 42 in the first gap G1. However, the present disclosure is not limited thereto. As illustrated in FIG. 5, the protruding portion 50 may be provided so as to protrude from the first joining member 40 in the first gap G1. In the first modification, the distal end 50A of the protruding portion 50 is spaced apart from the facing surface (inner peripheral surface) of the second joining member 42.

Second Modification

Figure 6:
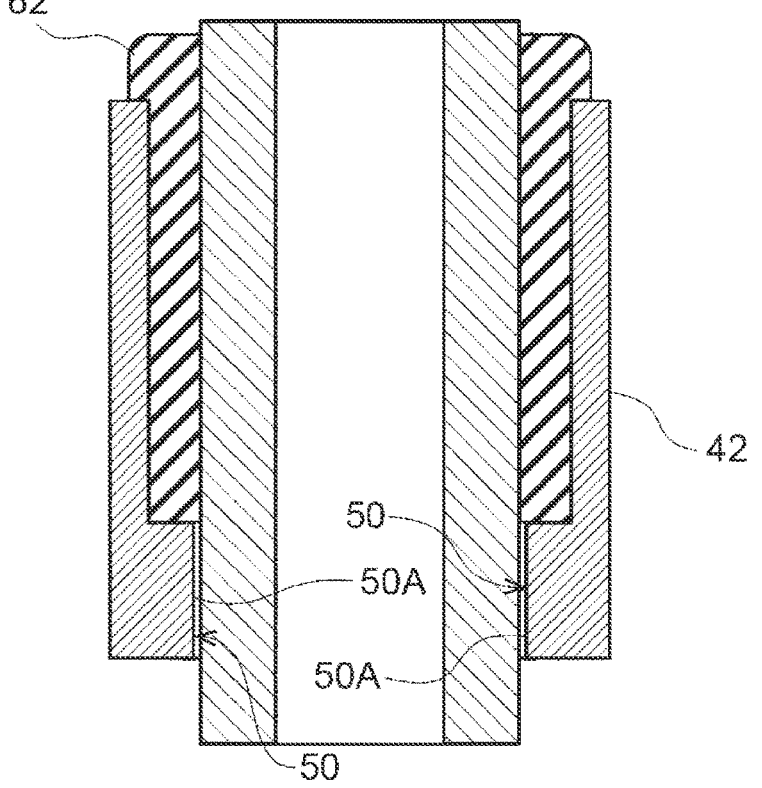
FIG. 6 is a cross-sectional view illustrating the second joining member and the second joining member according to the second modification.

In the above-described embodiment, the protruding portion 50 is provided at an intermediate portion of the second joining member 42 in the axial direction. However, the present disclosure is not limited thereto. As shown in FIG. 6, the protruding portion 50 may be provided at an axial end portion of the second joining member 42.

In this second modification, the protruding portion 50 is provided at the lower end portion of the second joining member 42 in the axial direction, and the elastic member 60 is disposed on the upper side of the protruding portion 50.

Although not shown in the drawings, a configuration may be adopted in which the protruding portion 50 is provided at the upper end portion in the axial direction of the second joining member 42, and the elastic member 60 is disposed on the lower side of the protruding portion 50.

In the above embodiment, the battery case 24 is elastically supported in the joining portion 30 between the rocker 14 and the battery case 24, but the present disclosure is not limited thereto. The configuration of the joining portion 30 of the above-described embodiment can be applied to the joining portion between the framework member and the battery case at the lower portion of the vehicle. For example, the present disclosure may be applied to a joining portion between a cross member extending in the vehicle width direction and a battery case.

In the above-described embodiment, the first joining member 40 and the body 12 are joined to each other by bolts and nuts, but they may be joined to each other by welding. In addition, although the battery case 24 and the support member 32 are joined to each other via brackets, the present disclosure is not limited thereto. For example, the extending end of the support member 32 may be joined by being welded to the side wall portion 24B of the battery case 24. Further, for example, the upper surface of the support member 32 may be joined to a flange provided with a joint portion between the lower case 26 and the upper case 28 of the battery case 24 by a bolt and a nut.

What is claimed is:

1. A battery mounting structure, comprising:

a body that makes up a framework of a vehicle;

a battery case that is joined to the body and that is mounted at an underfloor of the vehicle;

a first joining member that is joined to a body side, at a joining portion of the body and the battery case;

a second joining member that is joined to a battery case side and that is attached across a predetermined gap with respect to the first joining member;

an elastic member that is disposed in the gap and is interposed between the first joining member and the second joining member; and a protruding portion that is provided protruding from one of the first joining member and the second joining member to the gap.

2. The battery mounting structure according to claim 1, further comprising a support member that extends from a lateral side of the battery case to the body side, wherein the second joining member is joined to the battery case via the support member.

3. The battery mounting structure according to claim 2, wherein the support member includes a first support portion disposed on a vehicle-outward side with respect to the second joining member, and a second support portion disposed on a vehicle-inward side with respect to the second joining member.

4. The battery mounting structure according to claim 1, wherein the protruding portion is provided such that a distal end of the protruding portion is spaced apart from a counterface.

5. The battery mounting structure according to claim 1, wherein the first joining member and the second joining member are fashioned in a cylindrical shape of which an axial direction is in a vehicle-up-down direction, the first joining member is inserted inside the second joining member, and the elastic member includes a first elastic portion disposed on one side in the axial direction with respect to the protruding portion, and a second elastic portion disposed on another side in the axial direction with respect to the protruding portion.

* * * * *